April 28, 1964

H. M. MILLER 3,130,930

BUILDER APPARATUS

Filed May 29, 1961

INVENTOR.
HAROLD M. MILLER
BY
Brumbaugh, Free, Graves & Donohue
his ATTORNEYS

INVENTOR.
HAROLD M. MILLER

April 28, 1964     H. M. MILLER     3,130,930
BUILDER APPARATUS
Filed May 29, 1961     9 Sheets-Sheet 5
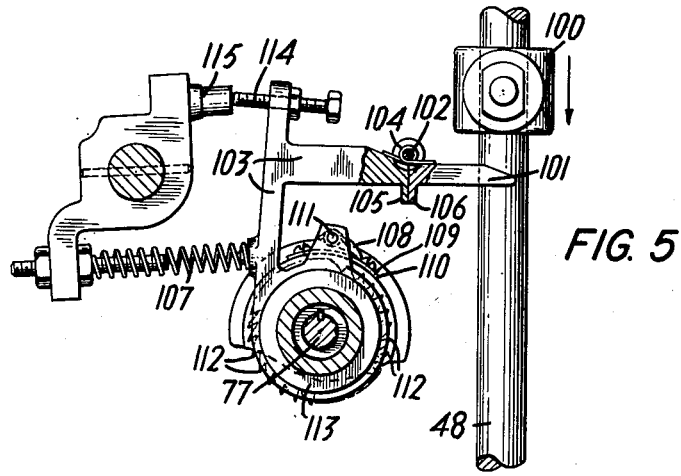
FIG. 5
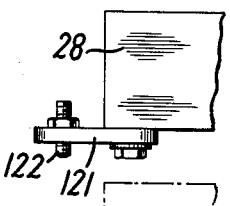
FIG. 6
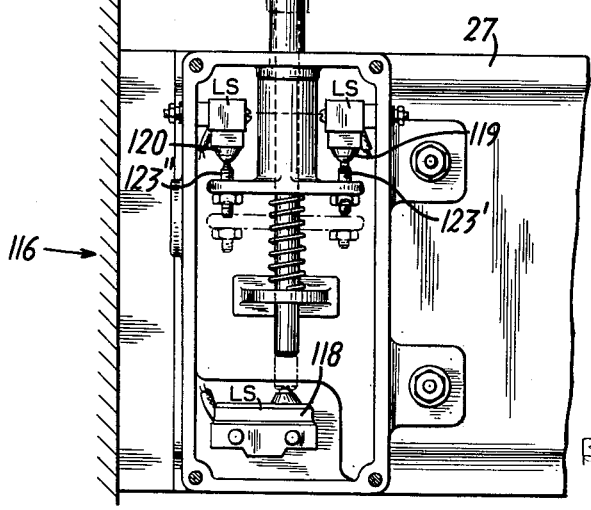
INVENTOR.
HAROLD M. MILLER
BY
Brumbaugh, Free, Graves & Donohue
his ATTORNEYS

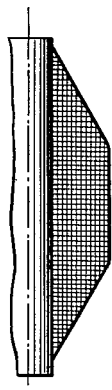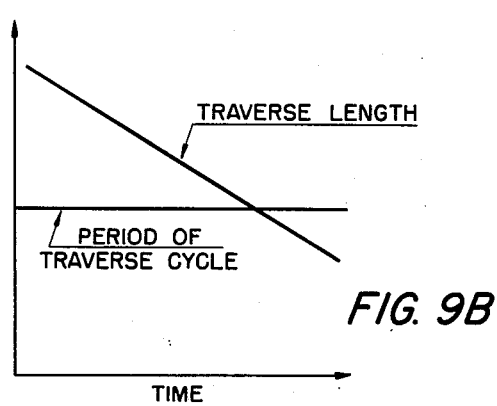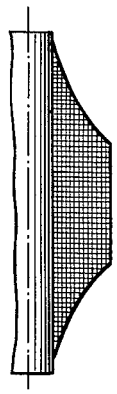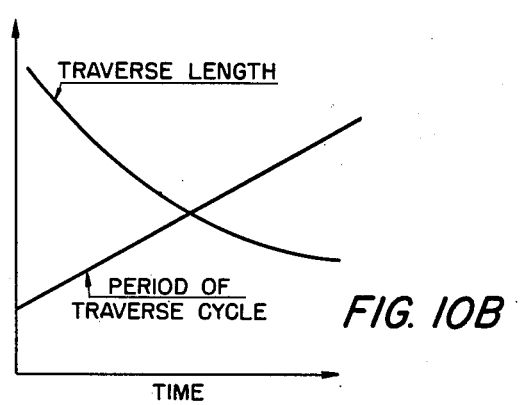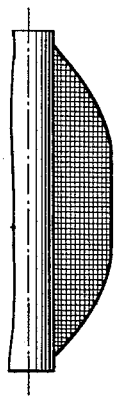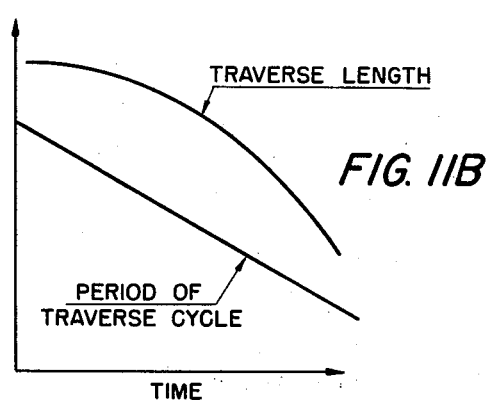

April 28, 1964    H. M. MILLER    3,130,930
BUILDER APPARATUS

Filed May 29, 1961    9 Sheets-Sheet 9

INVENTOR.
HAROLD M. MILLER
BY
Brumbaugh, Free, Graves & Donohue
his ATTORNEYS

United States Patent Office 3,130,930
Patented Apr. 28, 1964

3,130,930
BUILDER APPARATUS
Harold M. Miller, Whitinsville, Mass., assignor to Whitin Machine Works, Whitinsville, Mass., a corporation of Massachusetts
Filed May 29, 1961, Ser. No. 113,481
13 Claims. (Cl. 242—26.3)

This invention relates to builders for use in the textile industry and, more particularly, to a novel and highly versatile builder for programming the lengths of successive traverses and, independently thereof, the times required to complete the traverses.

At one or more intermediate stages in the manufacture of textile products, it is necessary to wind textile fibers, typically in the form of yarns, onto spindles to form "packages." A single package may include well over a hundred miles of yarn, wound about its associated spindle in a predetermined pattern so as to be capable of feeding off at great speed without tangling.

The profile or shape of a yarn package is a function of the lengths of successive traverses of the spindle by the spinning ring (or of the spinning ring by the spindle) occurring during the building process and of the time required to complete the traverses. There is no single package shape which is suitable for all purposes, and for some purposes a particular package shape is superior to all others. It is therefore necessary that mill operators be able to build packages of various shapes.

Conventional means for regulating the characteristics of successive traverses typically comprise a builder arm attached at one end to a fixed pivot shaft and free to oscillate at the other end in response to an input supplied by a continuously-rotated builder cam at an intermediate point along the length of the arm. The builder-lever-input point may be the point of contact of a cam follower on the builder arm with the rotating cam, and the builder-lever-output point the point of contact of a roller or similar device on the builder arm with means for actuating poker rods adapted to reciprocate either the ring rail or the spindle rail in a direction parallel to the spindle axes.

Variation in the lengths of successive traverses is effected by incremental radial displacement with respect to the builder-lever-pivot axis of the builder-lever-input point or the builder-lever-output point.

However, the period of oscillation of the poker rods and hence the period of the traverse cycle remain constant for a given rotational speed of the builder cam, despite variation in the lengths of successive traverses. Accordingly, conventional builders are limited as to the different types of yarn packages which they can produce.

Apparatus constructed in accordance with the invention overcomes the above-named disadvantage of conventional builders.

Broadly, the invention comprises first programming means for controlling the lengths of successive traverses and second programming means adjustable independently of the first programming means for controlling the periods of the traverse cycles. During the building of a package by the establishment of a relative traverse between a ring rail and a spindle rail, there is, of course, an acceleration and deceleration of the traverse member at opposite ends of its stroke. The member does not instantaneously assume its maximum speed but starts from a rest position, accelerates to a maximum velocity, and decelerates to a rest position at the opposite end of the traverse. Its instantaneous velocity varies with time during the traverse, but it has a given average velocity for the whole traverse. In accordance with the invention, the average traverse velocities are varied or "programmed" independently of variations in traverse length during the building of a package.

For an understanding of further particulars of the invention, reference is made to the following figures in the drawings, of which:

FIGURE 5 is a detailed view, partly in elevation and partly in section, of a preferred embodiment of apparatus constructed in accordance with the invention for providing the first programming means of FIGURE 4 with an input during each traverse cycle;

FIGURE 6 is a detailed view, partly in elevation and partly in section, of a preferred embodiment of apparatus constructed in accordance with the invention and mountable on a conventional spinning frame for facilitating the commencement of a package-building operation;

FIGURE 9A is a schematic representation of a profile of a package constructed by apparatus of the invention in which the length of the traverse is continually decreased by constant increments and the period of the traverse is held constant;

FIGURE 9B is a double graph showing the time dependency of traverse length and traverse period resulting in the package profile of FIGURE 9A;

FIGURE 10A is a schematic representation of a profile of a package constructed by apparatus of the invention in which the length of the traverse is continually decreased by progressively smaller increments and the period of the traverse is continually increased by constant increments;

FIGURE 10B is a double graph showing the time dependency of the traverse length and traverse period resulting in the package profile of FIGURE 10A;

FIGURE 11A is a schematic representation of a profile of a package constructed by apparatus of the invention in which the length of the traverse is continually decreased by progressively increased increments and the period of the traverse is continually decreased by constant increments;

FIGURE 11B is a double graph showing the time dependency of the traverse length and traverse period resulting in the package profile of FIGURE 11A;

Figure 1:
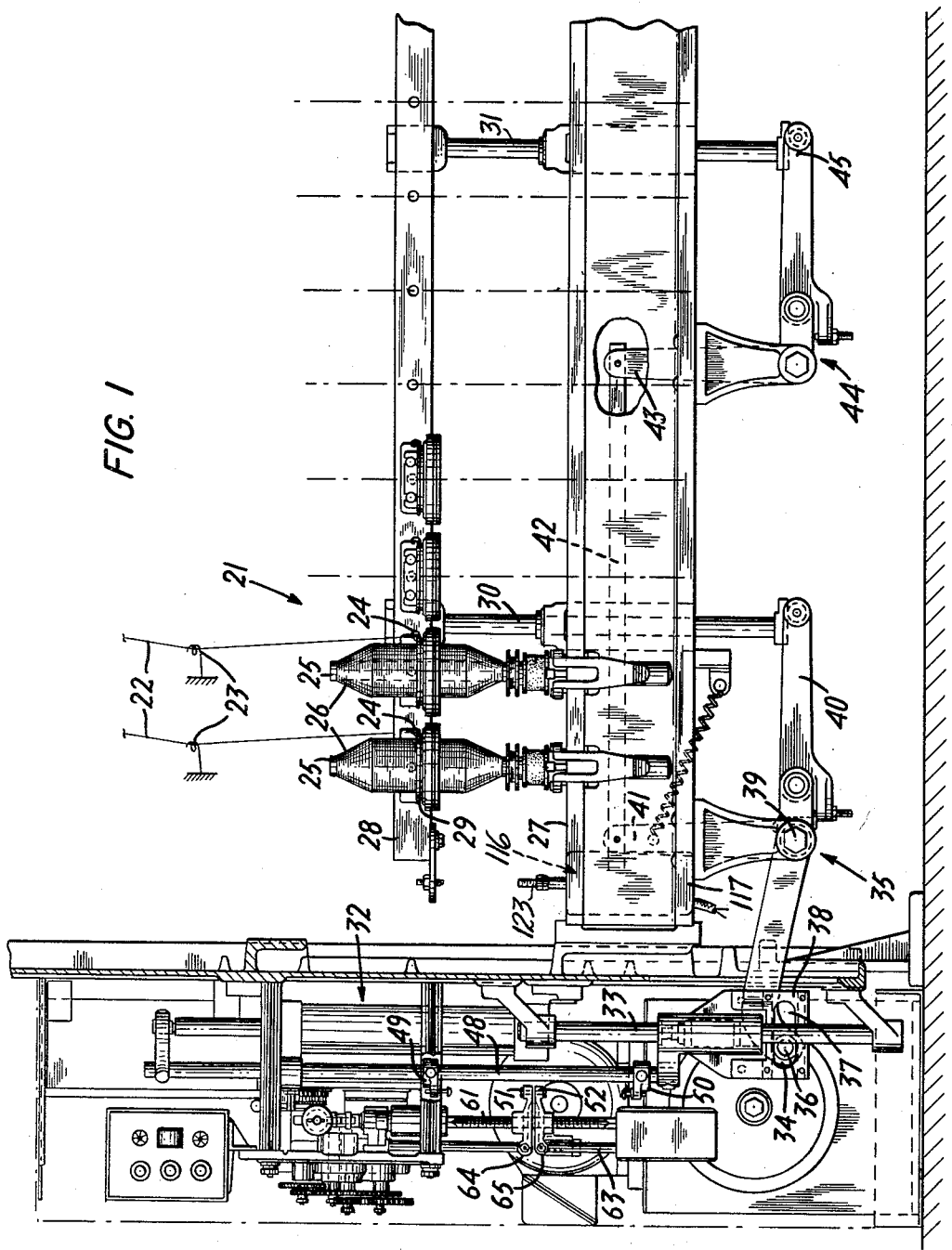
FIGURE 1 is a view in side elevation of a builder constructed in accordance with the invention, showing its use to control the builder motion of a conventional spinning frame.

FIGURE 1 shows a novel builder 20 constructed in accordance with the invention and adapted to control the builder motion of a conventional spinning frame 21. Yarns 22 are fed through yarn guides 23 and travelers 24 and wound around spindles 25. Yarn packages 26 are built by a rapid rotation of the spindles 25 and a simultaneous relative traverse between a spindle rail 27 on which the spindles 25 are mounted and a ring rail 28 on which spinning rings 29 are mounted.

Reciprocation of either the ring rail 28 or the spindle rail 27 in a direction parallel to the spindle axes effects a relative oscillatory motion or traverse between the two. In the spinning frame shown, poker rods 30 and 31 reciprocate the ring rail 28 with respect to the spindles 25.

The poker rods 30 and 31 are in turn reciprocated by a piston-cylinder assembly 32 forming part of the builder 20. A connecting rod 33 driven by the piston (not shown in FIGURE 1) of the piston-cylinder assembly 32 reciprocates one end 34 of a bell crank 35. The end 34 is held by a stud 36 in a slotted portion 37 of a member 38 affixed to the connecting rod 33. The bell crank 35 is pivoted about a pivot shaft 39 so that the end 40 opposite the end 34 is likewise reciprocated and adapted to oscillate the poker rod 30. Accordingly, when the piston (not shown in FIGURE 1) of the piston-cylinder assembly 32 moves down the ring rail 28 moves up, and when the piston moves up the ring rail moves down.

An upwardly-extending arm 41 on the bell crank 35 is connected by means of a horizontally-extending connecting rod 42 to an upwardly-extending arm 43 of an adjacent bell crank 44 having an end 45 adapted to reciprocate the poker rod 31 in unison with the poker rod 30. Additional poker rods can be reciprocated in this fashion in order to provide uniform lifting of the ring rail 28 throughout its length.

Figure 2:
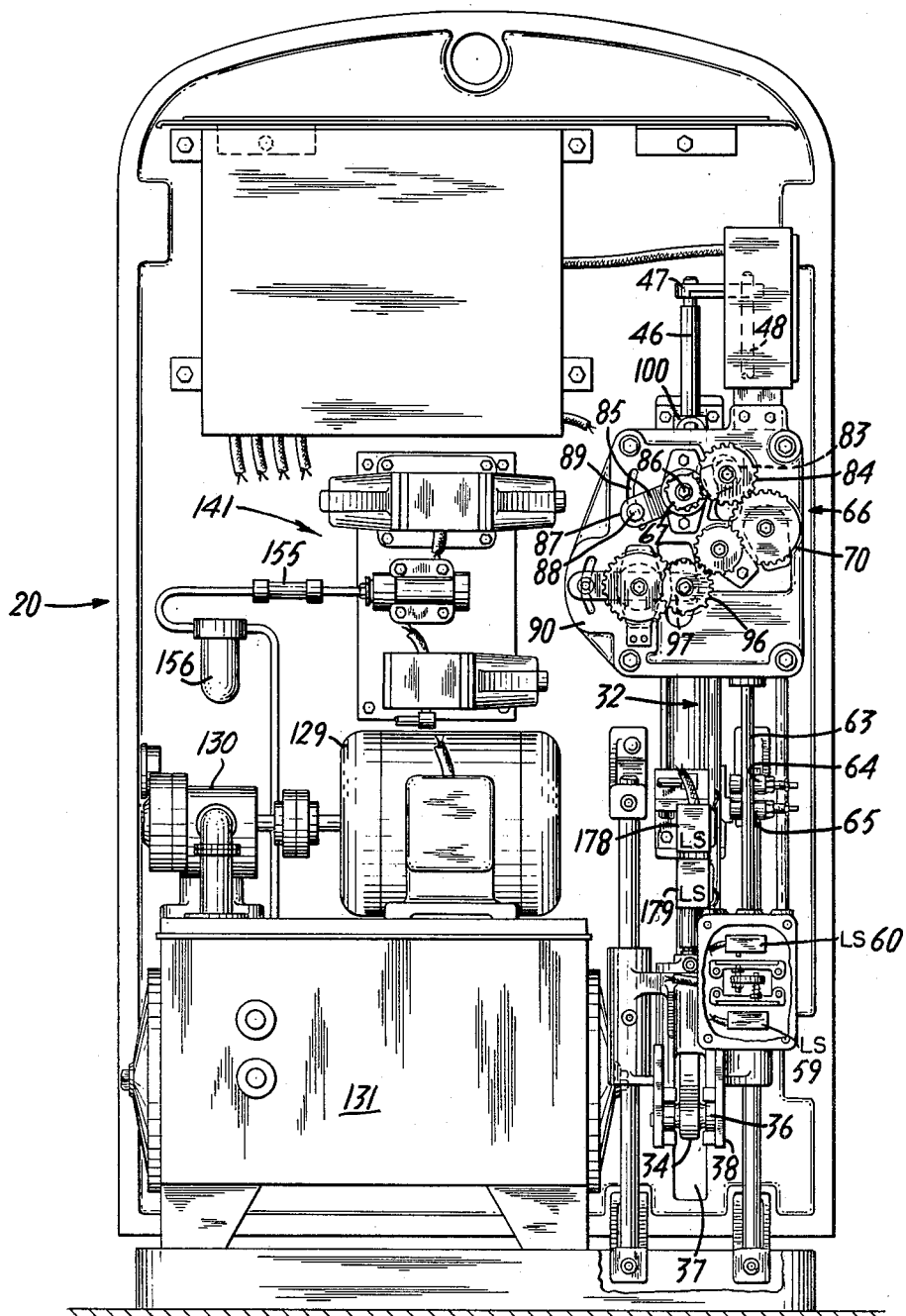
FIGURE 2 is a view in end elevation looking from the left of FIGURE 1 and showing a preferred embodiment of a builder constructed in accordance with the invention.

FIGURE 2, which is an end view from the left of FIGURE 1, shows the novel builder 20 in greater detail. The piston (not shown in FIGURE 2) of the piston-cylinder assembly 32 has an upper extension 46 rigidly connected by a short horizontal link 47 to a control rod 48 which reciprocates in unison with the piston of the piston-cylinder assembly 32.

Figure 3:
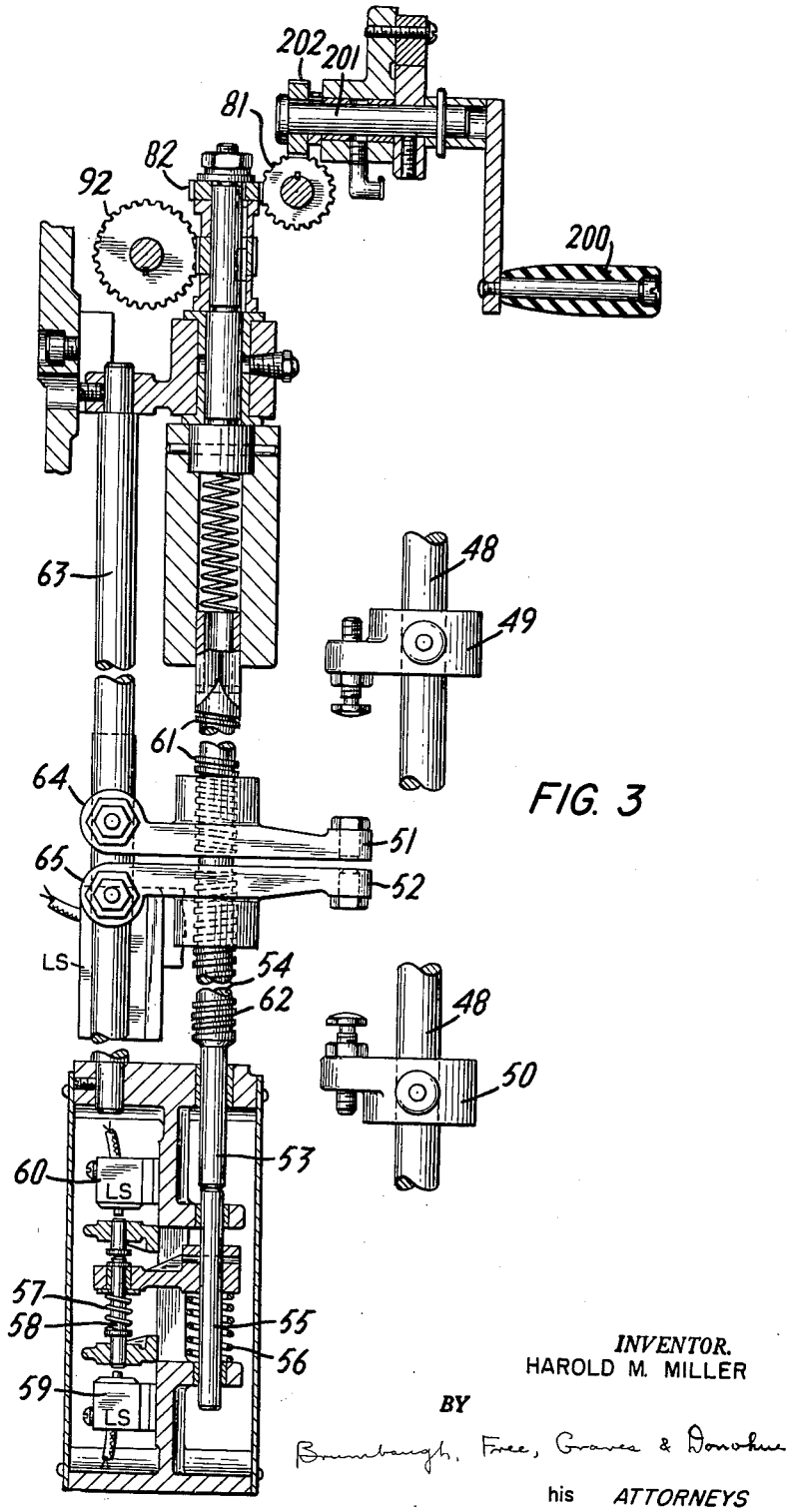
FIGURE 3 is a view, partly in elevation and partly in section, of controlling and limiting means constructed in accordance with the invention and adapted to facilitate control of the length of a traverse and reversal of the direction of the traverse.

FIGURE 3 shows controlling and limiting means for effecting reversal of the traverse at the opposite ends thereof. Trip means such as trip dogs 49 and 50 are rigidly attached to the reciprocating control rod 48 and adapted to co-operate with arresting means such as arresting dogs 51 and 52. As the control rod 48 reciprocates, the trip dogs 49 and 50 alternately make contact with the arresting dogs 51 and 52, respectively.

When the trip dog 49 on its downward stroke makes contact with the arresting dog 51, it forces an extension 53 of a control screw 54 downwardly against a stroke-control plunger 55 and compresses a spring 56 and a spring 57, thereby forcing the auxiliary stroke-control plunger 58 downwardly and tripping a limit switch 59. The tripping of the limit switch 59 actuates hydraulic and electrical systems hereinafter described and reverses the direction of the traverse.

When the trip dog 50 on its upward stroke makes contact with the arresting dog 52, it causes the extension 53 of the control screw 54 to lift from the stroke control plunger 55, and the springs 56 and 57 force the auxiliary stroke control plunger 58 upwardly to trip a limit switch 60. The tripping of the switch 60 effects another reversal of the direction of the traverse.

Inasmuch as the control rod 48 reciprocates with the piston of the piston-cylinder assembly 32, one of the two switches 59 and 60 is tripped at each end of the traverse.

The length of the traverse is controlled by rotation of the control screw 54, which has an upper threaded portion 61 and a lower portion 62 threaded oppositely to the upper portion 61. The screw 54 is rotatable about its longitudinal axis. The arresting dogs 51 and 52 are mounted on the screw 54 and are prevented from rotating with the screw by means of a vertical shaft 63 extending parallel to the screw and engaging the ends 64 and 65 of the dogs 51 and 52, respectively.

Accordingly, rotation of the screw 54 effects longitudinal displacement of the arresting dogs 51 and 52 with respect to each other. Inasmuch as the distance between the trip dogs 49 and 50 is constant for a given set-up of the builder 20, and inasmuch as the direction of the traverse is reversed each time one of the trip dogs 49 and 50 makes contact with the corresponding one of the arresting dogs 51 and 52, an incremental displacement of the arresting dogs 51 and 52 with respect to each other longitudinally of the control screw 54 during each traverse cycle varies the length of successive traverses.

In particular, if the arresting dogs 51 and 52 are initially adjacent to each other as shown in FIGURE 3, rotation of the control screw 54 during each traverse cycle in such a way as to separate the arresting dogs 51 and 52 from each other shortens successive traverses.

The amount of incremental shortening of successive traverses is proportionate for a given pitch of the control screw 54 to the angle through which the screw turns during each traverse cycle. If the control screw incremental turn is constant for each traverse cycle, the incremental shortening of successive traverses is also constant; and if the variation in the incremental rotation of the control screw 54 is nonlinear, the variation in the incremental shortening of successive traverses is also nonlinear.

Figure 4:
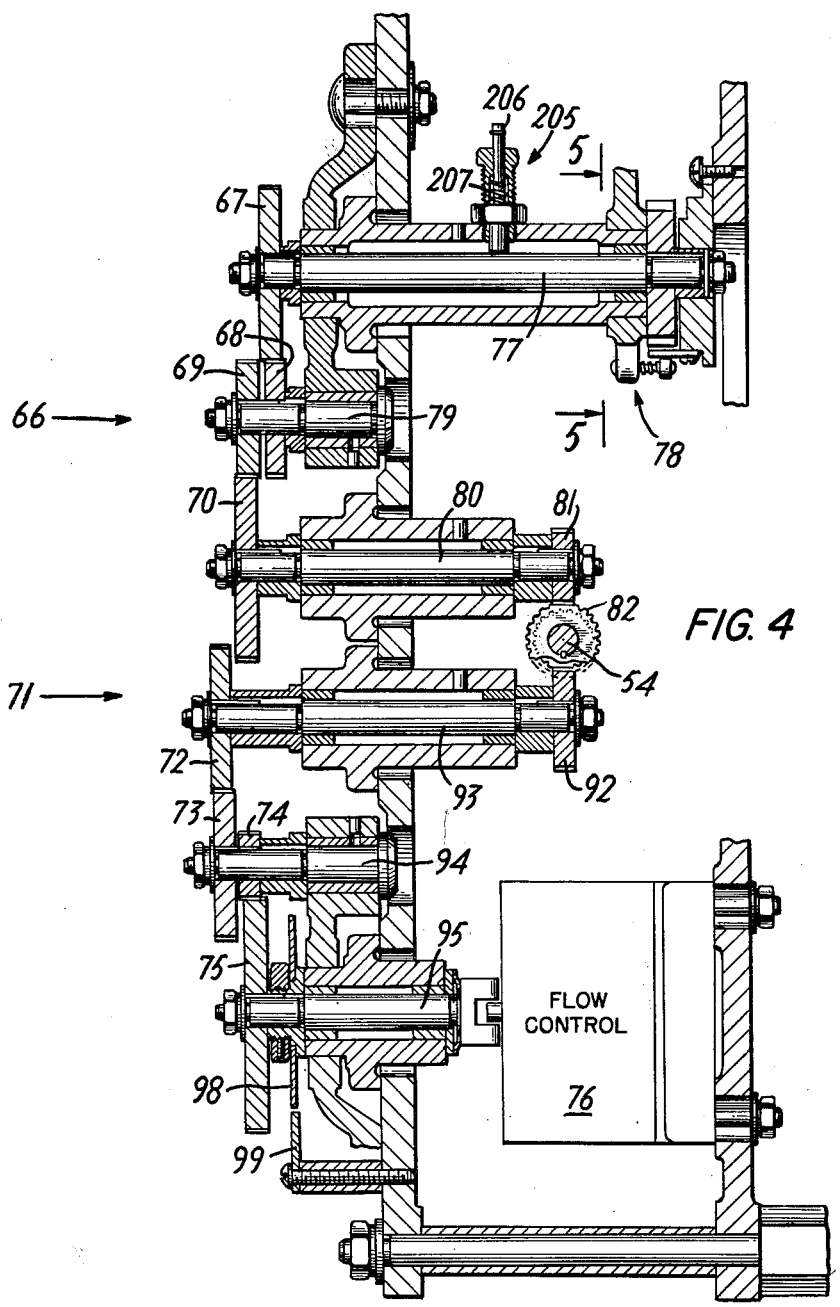
FIGURE 4 is a schematic view of first and second novel programming means constructed in accordance with the invention and adapted to control, respectively, the lengths of successive traverses and the times required to complete the traverses.

FIGURE 4 shows a first programming means 66 comprising gears 67, 68, 69 and 70 adapted to control the incremental rotation of the control screw 54 and a second programming means 71 comprising a train of gears 72, 73, 74 and 75 adapted to control a flow-control means such as a flow-control valve 76. The flow-control valve 76 controls the flow of fluid in the hydraulic system to and from the piston-cylinder assembly 32 and therefore the velocity of the traverse.

The gear 67 is rotated on a shaft 77 which carries at the end thereof opposite the gear 67 a pawl-and-ratchet mechanism 78 adapted to supply the shaft 77 and hence the gear 67 and the first programming means 66 with an input during each traverse cycle in a manner hereinafter described. The gear 67 is peripherally engaged with the gear 68, which is rotated coaxially with the gear 69 on a shaft 79. The gear 69 is peripherally engaged with the gear 70, which is rotated on a shaft 80. The end of the shaft 80 opposite the gear 70 carries a gear 81 engaging a gear 82 on the control screw 54. Accordingly, the input to the first programming means 66 is transmitted as an input to the control screw 54 having a magnitude bearing a definite relationship to the magnitude of the input to the first programming means 66.

The first programming means 66 includes a novel means for establishing any desired output-to-input ratio. One or more of the gears 67, 68, 69 and 70 are removable, and replacement gears substitutive for the removable gears can be placed in the train of the gears, thereby changing the mechanical advantage of the gear train. Conveniently, the gears 68 and 69 can be removed, and gears 83 and 84 (FIGURE 2) can be substituted therefor.

As FIGURE 2 shows, the two middle gears, in this case the gears 83 and 84, of the train of gears comprising the first programming means 66 are mounted on a lever 85 pivotable about a point 86 passing through the first gear 67 of the programming means 66. The end 87 of the lever 85 opposite the end which carries the gears 83 and 84 carries means 88 for locking the end 87 in an arcuate slot 89 in a plate 90 held stationary with respect to the builder 20.

The removable gears 68 and 69 (FIGURE 4) are peripherally engaged with the gears 67 and 70, respectively adjacent thereto. The replacement gears 83 and 84 (FIGURE 2) are also respectively engaged peripherally with the gears 67 and 70.

As FIGURE 4 shows, the second programming means 71 is similar to the first programming means 66. The input to the second programming means 71 is from the control screw 54 via a gear 92 mounted on a shaft 93 which carries the gear 72 at the end opposite the end carrying the gear 92. The gear 72 is peripherally engaged with the gear 73, which is mounted coaxially with the gear 74 on a shaft 94. The gear 74 is peripherally engaged with the gear 75, which is mounted on a shaft 95. The shaft 95 is connected to the flow control valve 76 and regulates the flow of oil or other fluid through the flow control valve 76.

The gears 73 and 74 (FIGURE 4) can be replaced by gears 96 and 97 (FIGURE 2), so that the output-to-input ratio of the second programming means 71 is pre-determinable.

A flow-control dial 98 and a flow-control index 99 facilitate calibration of the flow-control valve 76 and determination of the rate of flow of fluid therethrough.

FIGURE 5 shows a means for providing the shaft 77 and hence the first programming means 66 with an input during selected ones of successive traverses. An input could be provided during every transverse or ever fourth traverse, etc., but is here shown as provided during every second traverse, i.e., once during each traverse cycle. The reciprocated control rod 48 carries a projecting lug 100 adapted to engage a finger 101 connected at 102 to an arm 103 in such a manner as to be pivotable upwardly with respect to the arm against the pull of a bias spring 104. The finger 101 is prevented from pivoting downwardly with respect to the arm 103 by abutting shoulders 105 and 106.

As the projecting lug 100 moves upwardly as shown in FIGURE 5 into contact with the finger 101, the pivoting of the finger 101 with respect to the arm 103 allows the projecting lug 100 to pass without rotating the shaft 77. When the control rod 48, during its downward motion, brings the lug 100 into contact with the upper face of the finger 101, however, the entire arm 103 is rotated about the pivot shaft 77 against the pull of a tension spring 107 connected to a stationary portion of the builder mechanism 20. A pawl 108 rides over a shield 109 to the end 110 thereof and is then forced by a spring 111 into engagement with teeth 112 of a ratchet wheel 113. The ratchet wheel 113 is rigidly mounted on the shaft 77, and rotation of the wheel by the projecting lug 100 during its downward stroke effects rotation of the shaft until the lug 100 moves beyond the reach of the finger 101, whereupon the spring 107 returns the arm 103 to its starting position in which an adjustable nut 114 abuts a stop 115. Because of the pitch of the teeth 112, the pawl 108 rides over the tops of the teeth during the return stroke, so that the shaft 77 is not then rotated.

The mechanism shown in FIGURE 5 is therefore adapted to generate an input to the first programming means 66 during each traverse cycle. The magnitude of the input is controllable by the relative position of the shield 109 with respect to the ratchet wheel 113. The position may be continually changed during the building operation by conventional means.

FIGURE 6 shows a wind-down and tailing switch box 116 located at an end 117 (FIGURE 1) of the spindle rail 27. The switch box 116 houses limit switches 118, 119 and 120. A horizontally-projecting lug 121 on the ring rail 28 carries a vertical pin 122 which co-operates with a vertical plunger 123 projecting from the box 116.

At the start of the building operation, the ring rail 28 is in its "wind-down" position, the pin 122 forcing the plunger 123 downwardly so that the limit switch 118 is contacted by the plunger 123. When the ring rail 28 commences to rise, the limit switch 118 is tripped as the plunger 123 separates therefrom.

At the start of the dwell, the limit switch 119 is contacted by a pin 123' integral with the plunger 123, and after the dwell the limit switch 120 is contacted by a pin 123" also integral with the plunger 123. Thus, the upward motion of the plunger 123 is adapted to trip the switch 119 a short time before it trips the switch 120. The function of the limit switches 118, 119 and 120 is explained more fully in connection with the electric circuitry shown in FIGURE 8.

Figure 7:
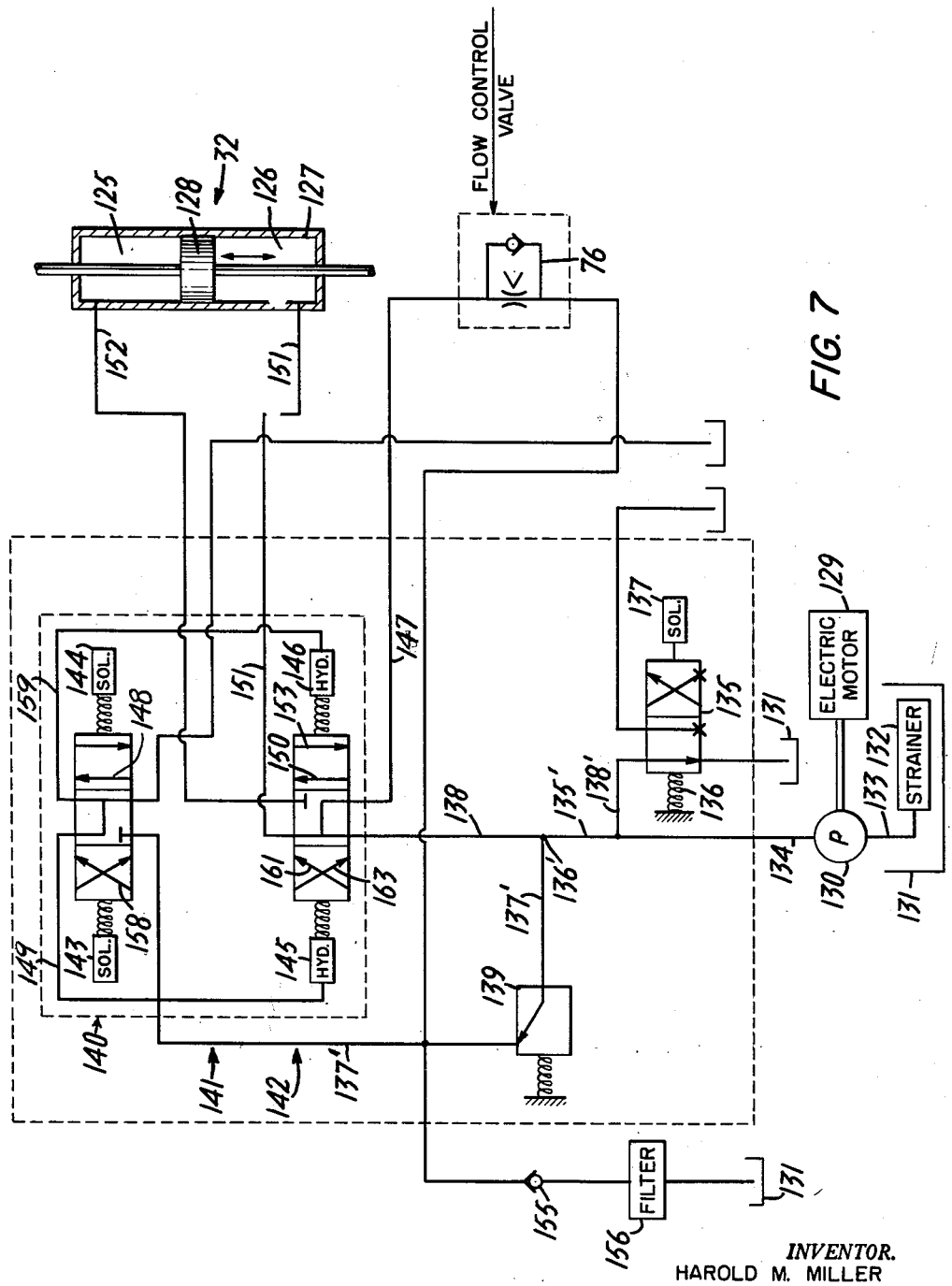
FIGURE 7 is a schematic representation of a hydraulic system constructed in accordance with the invention and regulated by the second programming means of FIGURE 4 to control the velocity of the traverse.

FIGURE 7 shows schematically a hydraulic system constructed in accordance with the invention and adapted to supply a fluid such as oil alternately to an upper chamber 125 and a lower chamber 126 of a cylinder 127 of the piston-cylinder assembly 32, thereby reciprocating a piston 128.

An electric motor 129 powers a pump 130 which withdraws the oil from a sump 131 through a strainer 132 and a pipe 133 and pumps it through a line 134. A two-position by-pass valve 135 operated by a spring 136 and a solenoid 137 in a manner hereinafter explained unloads the pump 130 to the sump 131 during non-operating periods as shown in FIGURE 7.

Although for convenience the sump 131 is illustrated in FIGURE 7 as a plurality of sumps, it is obvious that in practice a single sump can conveniently be used.

With the solenoid 137 energized, the valve 135 moves to its left-hand position as shown in FIGURE 7 so that a line 138' communicating with the line 134 is blocked off and the oil in the line 134 continues through a line 135' and divides at a junction 136' to flow into a line 137' and a line 138. The line 137' extends through a pressure-relief valve 139 and into a pilot section 140 of a four-way reversing valve 141. The oil in the line 138 flows to a power section 142 of the four-way valve 141.

The pilot section 140 is a three-position valve actuated by solenoids 143 and 144 in a manner hereinafter explained. The power section 142 is a three-position valve hydraulically actuated by the pilot section 140 with the aid of piston-cylinder assemblies 145 and 146.

The four-way valve 141 is adapted alternately to supply oil to and evacuate it from the upper and lower chambers 125 and 126, respectively. A line 147 extending from the power section 142 of the four-way valve 141 leads through the flow-control valve 76, which is adjusted by the second programming means 71 to offer varying resistance to the flow of fluid.

With the four-way valve 141 in the position shown in FIGURE 7, the piston-cylinder assembly 32 is in neutral; that is, the piston 128 is forced neither upwardly nor downwardly.

With the solenoid 143 energized so that the pilot section 140 moves to the left-hand position as shown in FIGURE 7, oil flows through the line 137', a line 148 and a line 149 and to the piston-cylinder assembly 145. The power section 142 is then forced to the left as seen in FIGURE 7 so that oil flows through the line 138, a line 150 and a line 151 and into the chamber 126, forcing the piston 128 upwardly. Oil thereupon flows out of the upper chamber 125 through a line 152, a line 153, the line 147, the flow-control valve 76, a valve check 155, a filter 156 and into the sump 131. During this time the ring rail is, of course, moving downwardly.

When the solenoid 144 is energized so that the pilot section 140 moves to its right-hand position, oil flows through the line 137', a line 158 and a line 159 and to the piston-cylinder assembly 146, driving the power section 142 to the right. Oil then flows through the line 138, a line 161, the line 152 and into the upper chamber 125 driving the piston 128 downwardly.

Oil is thereupon forced out of the lower chamber 126, through the line 151, a line 163, the line 147, the flow control valve 76, the valve check 155 and the filter 156 and into the sump 131.

Figure 8:
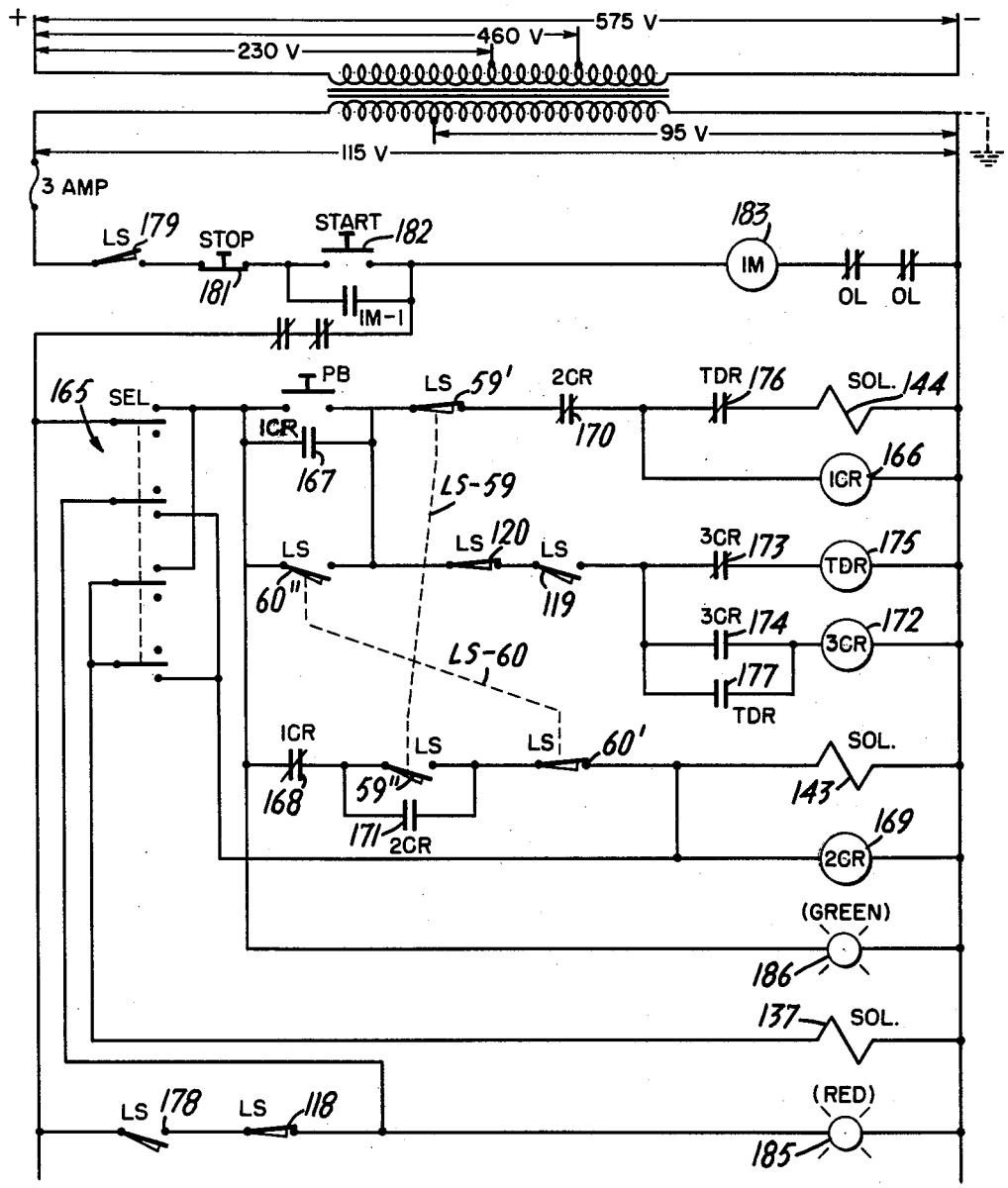
FIGURE 8 is a schematic representation of an electric circuit constructed in accordance with the invention.

FIGURE 8 shows electrical apparatus for use with the hydraulic and mechanical systems previously described. The components of the electrical system include a selector switch 165 having upper, neutral and lower positions; a first relay coil 166 governing the condition of a set of normally-open contacts 167 and a set of normally-closed contacts 168; a second relay coil 169 governing the condition of a pair of normally-closed contacts 170 and a pair of normally-open contacts 171; a third relay coil 172 governing the condition of a set of normally-closed contacts 173 and a set of normally-open contacts 174; a time-delay relay 175 governing the condition of a set of normally-closed contacts 176 and a set of normally-open contacts 177; the solenoids 137, 143 and 144; the limit switches 59, 60, 118, 119 and 120; and limit switches 178 and 179.

With the builder 20 in the wind-down position, the selector switch 165 is in its intermediate or neutral position, and the first relay coil 166 is de-energized so that the normally-closed contacts 168 are closed and the normally-open contacts 167 are open; the second relay coil 169 is also de-energized so that the normally-closed contacts 170 are closed and the normally-open contacts 171 are open; the third relay coil 172 is de-energized so that the normally-closed contacts 173 are closed and the normally-open contacts 174 are open; the time-delay relay 175 is de-energized so that the normally-closed contacts 176 are closed and the normally-open contacts 177 are open; all of the solenoids 137, 143 and 144 are de-energized; the limit switches 118 and 119 are open; a pair of normally-closed contacts 59', forming a part of the limit switch 59, are closed, and a pair of normally-open contacts 59", forming a part of the same limit switch, are open; a pair of normally-closed contacts 60', forming a part of the limit switch 60, are open, and a pair of normally-open contacts 60", forming a part of the same limit switch, are closed; the limit switches 120 and 178 are both closed, and the limit switch 179 is open; a stop button 181 and a start button 182 are both open and an auxiliary start motor 183 is de-energized.

To commence the building process, the start button 182 is depressed, thus energizing the motor 183. The motor 183 remains energized, of course, after the start button 182 is released, and the pump 130 is in operation.

To cause the ring rail 28 to commence its upward movement, the selector switch 165 is thrown into the upper position shown in FIGURE 8. The relay coil 166 is energized so that the normally-closed contacts 168 are open and the normally-open contacts 167 are closed. The solenoids 137 and 144 are energized, and the limit switch 118 is closed as previously explained.

At the start of the dwell, the time-delay relay 175 is energized so that the normally-closed contacts 176 are open and the normally-open contacts 177 are closed. The solenoid 144 is de-energized. The limit switch 119 is energized as previously explained.

During the dwell, the relay coil 172 is energized so that the normally-closed contacts 173 are open and the normally-open contacts 174 are closed. The time-delay relay 175 is de-energized, but the normally-closed contacts 176 remain open and the normally-open contacts 177 remain closed because of the time-delay feature.

At the end of the dwell, when the solenoid 144 is once again energized, the ring rail 28 begins to move upwardly again.

Next, with the ring rail 28 still moving upwardly, the normally-closed contacts 176 close and the normally-open contacts 177 open in response to the de-energized condition of the time-delay relay 175. In addition, the limit switch 120 opens as previously explained.

After the ring rail 28 has risen to such a point that the trip dog 50 is disengaged from the arresting dog 52, the limit switch 60 reverses so that the normally-closed contacts 60' are closed and the normally-open contacts 60" are open. The ring rail 28 continues to rise.

When the ring rail 28 completes the first traverse, the switch 59 reverses as previously explained so that the normally-closed contacts 59' open and the normally-open contacts 59" close. The relay coil 166 is deenergized, and the normally-closed contacts 168 close and the normally-open contacts 167 open. The relay coil 169 is energized, and the normally-closed contacts 170 open and the normally-open contacts 171 close. The solenoid 143 is energized, and the solenoid 144 is deenergized. Thus, the piston 128 and the control rod 48 begin to move upwardly, so that the ring rail 28 commences its downward traverse.

As the ring rail 28 begins to move downwardly, the limit switch 59 reverses again because of the action of the springs 56 and 57 so that the normally-open contacts 59" open and the normally-closed contacts 59' close.

At the bottom of the second traverse, the limit switch 60 is reversed as previously set forth so that the normally-closed contacts 60' are open and the normally-open contacts 60" are closed. The relay coil 169 is de-energized so that the normally-closed contacts 170 are closed and the normally-open contacts 171 are open. The relay coil 166 is energized so that the normally-closed contacts 168 are open and the normally-open contacts 167 are closed. The solenoid 144 is energized and the solenoid 143 is de-energized. Thus, the piston 128 and the control rod 48 begin to move downwardly, so that the ring rail 28 commences its upward traverse.

When the ring rail 28 begins to move up, the limit switch 60 reverses its position again because the weight of the control screw 54 slightly compresses the springs 56 and 57, and the normally-closed contacts 60' close and the normally-open contacts 60" open.

The electrical system thus far described is adapted to control, in combination with mechanical and hydraulic systems constructed in accordance with the invention, the characteristics of successive traverses during the building process. Additional components of the electrical system include signal lights 185 and 186 and the safety limit switch 179.

The following description of various packages which can be constructed by the apparatus of the invention may serve to illustrate some of the capabilities of the apparatus.

FIGURE 9A is a schematic representation of a profile of a package uniformly tapered at its opposite ends. The tapered upper and lower portions are frustum-shaped.

FIGURE 9B is a double graph showing the time dependency of the traverse length and traverse period resulting in the package profile of FIGURE 9A. As the graphs show, the length of the traverse is continually decreased by constant increments and the period of the traverse is held constant. In order to maintain a constant traverse period the traverse velocity must, of course, be reduced exactly in proportion to the reduction in traverse length. Such reduction in traverse velocity is accomplished by proper selection of the gears in the second programming means 71. The slope of the graph of traverse length in FIGURE 9B is dependent on the gears selected for the first programming means 66.

FIGURE 10A is a schematic representation of a profile of another yarn package constructed by apparatus of the invention. The upper and lower portions of the package are tapered in the same way and have concave projections on a plane parallel to the spindle axis.

FIGURE 10B is a double graph showing the time dependency of the traverse length and the traverse period resulting in the package profile of FIGURE 10A. As the double graphs show, the length of the traverse is continually decreased by progressively smaller increments and the period of the traverse is continually increased by constant increments. Accordingly, gears are selected for the second programming means 71 for continually decreasing traverse velocity by progressively smaller increments. The nonlinear input required to produce the traverse length pattern of FIGURE 10B is obtained by continual adjustment of the shield 109 (FIGURE 5) with respect to the ratchet wheel 113 during the building process. For a given pattern of movement of the shield 109 with respect to the wheel 113, the slope of the traverse-length curve of FIGURE 10B is dependent on the gears selected for the first programming means 66.

FIGURE 11A is a schematic representation of a profile of a yarn package constructed by apparatus of the invention in which the upper and lower portions of the package are tapered in the same way and have convex projections on a plane parallel to the spindle axis.

FIGURE 11B is a double graph showing the time dependency of the traverse length and traverse period resulting in the package profile in FIGURE 11A. As the graphs show, the length of the traverse is continually decreased by progressively increased increments and the period of the traverse is continually decreased by constant increments. Traverse velocity would therefore graph against time as a line concave downward. The gears of the second programming means 71 are selected to provide such a velocity pattern. The nonlinear input for producing the nonlinear traverse length graph of FIGURE 11B is, of course, generated by the ratchet wheel and adjustable shield 113, 109 (FIGURE 5). For a given shield-movement pattern, the slope of the traverse-length graph of FIGURE 11B is dependent on the gears selected for the first programming means 66.

Figure 12A:
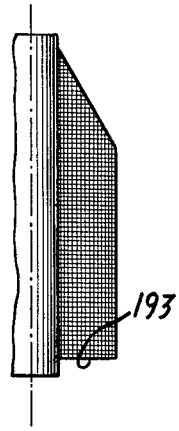
FIGURE 12A is a schematic representation of a profile of another yarn package which can be built by apparatus constructed in accordance with the invention.

FIGURE 12A is a schematic representation of a profile of another yarn package which can be built by apparatus constructed in accordance with the invention.

Figure 12B:
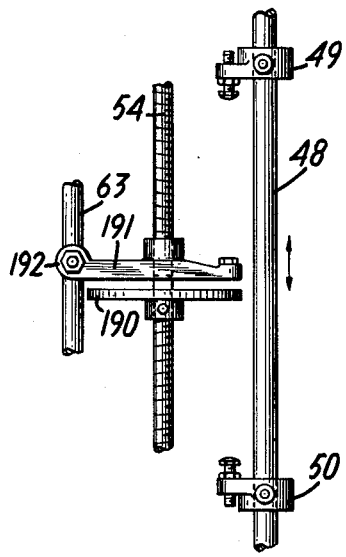
FIGURE 12B is a fragmentary view in elevation of an alternate embodiment of control means for use in building the package of FIGURE 12A.

FIGURE 12B is a fragmentary view in elevation of an alternate embodiment of control means for use in building the package shown in FIGURE 12A. The control screw 54 may be threaded as shown in FIGURE 12B or may be threaded in the same direction throughout its length. A disc 190 attached to the control screw 54 is free to rotate therewith so that, as the control screw 54 rotates, the position of the disc longitudinal of the screw 54 remains constant. An arresting dog 191 is prevented from rotating in the manner previously described by the shaft 63, which is slidably connected to the end 192 of the arresting dog 191. Accordingly, rotation of the screw 54 effects longitudinal displacement of the arresting dog 191 with respect to the disc 190.

The lower trip dog 50 on its upward stroke contacts the disc 190 at the same elevation during each traverse cycle. The bottom 193 of the yarn package of FIGURE 12A is therefore flat. The upper trip dog 49 contacts the arresting dog 191 at locations depending on the rotation imparted to the control screw 54 by the pawl-and-ratchet assembly 78 (FIGURES 4 and 5) and the first programming means 66 (FIGURE 4).

Figure 13A:
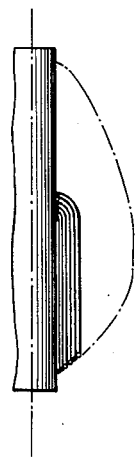
FIGURE 13A is a schematic representation of a profile of another yarn package which can be built by apparatus of the invention.

FIGURE 13A is a schematic representation of a profile of another yarn package which can be built by apparatus of the invention.

Figure 13B:
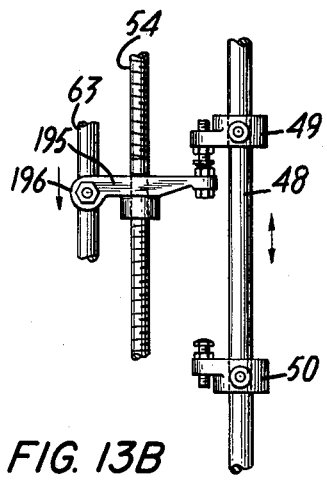
FIGURE 13B is a fragmentary view in elevation of another alternate embodiment of control means for use in building the yarn package of FIGURE 13A.

FIGURE 13B is a fragmentary view in elevation of another alternate embodiment of control means for use in building the yarn package of FIGURE 13A. Only a single arresting means (a dog 195) is used, and it is prevented from rotating with the screw 54 by means of the shaft 63 slidably attached at the end 196 of the arresting dog 195. Accordingly, both the lower and upper limits of a given traverse are displaced in the same direction with respect to the lower and upper limits of the previous traverse. The taper at the ends of the yarn package (FIGURE 13A) need not be the same, because the adjustable shield 109 is adapted to vary the pick of the pawl-and-ratchet assembly 78 (FIGURES 4 and 5) during the building process and thereby control the gain.

In the light of the preceding disclosure, the versatility of apparatus constructed in accordance with the invention is readily appreciated. Obviously, many types of yarn packages besides those shown in FIGURES 9A, 10A, 11A, 12A and 13A can be built by apparatus constructed in accordance with the invention.

For example, if a given ratio of the product of the number of teeth in the gear 72 and the number of teeth in the gear 74 to the product of the number of teeth in the gear 73 and the number of teeth in the gear 75 has a value giving a constant period of oscillation, then a decreasing period of oscillation can be obtained by making the ratio smaller. The rate of increase or decrease in the period is controllable by the amount by which the ratio is increased or decreased.

To increase the taper angle of the yarn package, it is necessary merely to increase the period of the traverse or to decrease the ratio of the product of the number of teeth in the gear 67 and the number of teeth in the gear 69 to the product of the number of teeth in the gear 68 and the number of teeth in the gear 70. To decrease the taper angle it is necessary merely to decrease the period of the traverse or to increase the ratio of the product of the number of teeth in the gear 67 and the number of teeth in the gear 69 to the product of the number of teeth in the gear 68 and the number of teeth in the gear 70.

To increase the weight of yarn on a package it is necessary merely to increase the period of the traverse until the package approaches instability or decrease the ratio of the product of the number of teeth in the gear 67 and the number of teeth in the gear 69 to the product of the number of teeth in the gear 68 and the number of teeth in the gear 70.

Auxiliary equipment for use in accordance with the invention includes a handle 200 for turning a shaft 201 and gears 202, 81, and 82 (FIGURE 3), by means of which the arresting dogs 51 and 52 can be moved manually to any desired position, and a brake 205 having a plunger 206 held by a compression spring 207 against the shaft 77 (FIGURE 4), thereby preventing backlash of the shaft 77 during the operation of the pawl-and-ratchet assembly 78.

Thus, there is provided in accordance with the invention novel and highly versatile means for building yarn packages of various shapes. Inasmuch as many modifications of the invention are possible within the spirit and scope of the invention, the invention is to be construed as including all of the modifications which come within the scope of the appended claims.

I claim:
1. A builder for use in a machine having two members mounted for a relative traverse with respect to each other, comprising traverse means connected to at least one of said members for establishing an oscillatory relative traverse of said members with respect to each other, first programming means connected to said traverse means and responsive to said traverse for effecting incremental changes in the lengths of selected ones of successive traverses, said first programming means including a first plurality of entrained gears forming a first train of gears of which at least one gear is removable from said train and further including a first replacement gear substitutive for said one gear, said first replacement gear having a size different from that of said one gear, limiting means connected to said first programming means and having positions which are controlled by said first programming means and which determine the positional limits of the traverse, traverse velocity being independent of said positions, and second programming means adjustable independently of said first programming means, connected to said traverse means and responsive to said traverse for effecting incremental changes in the velocities of selected ones of successive traverses to provide a multiplicity of average traverse velocities, said second programming means including a second plurality of entrained gears of which at least one gear is removable from said second train and further including a second replacement gear substitutive for said one gear of said second train, said second replacement gear having a size different from that of said one gear of said second train.

2. A builder as defined in claim 1, further comprising means connected to said first programming means for providing said first programming means with an input during each traverse cycle, said first programming means being adapted to generate an output having a magnitude bearing a predeterminable relation to the magnitude of said input, and means connected to said first and second programming means and responsive to the output of said first programming means for providing said second programming means with a second input during each traverse cycle, said second programming means being adapted to generate an output having a magnitude bearing a predeterminable relation to the magnitude of said second input.

3. A builder as defined in claim 2, in which the means responsive to the output of said first programming means is a rotatable control screw having first and second oppositely-threaded portions, further comprising a first arresting means mounted on said first portion, a second arresting means mounted on said second portion, the separation between said first and second arresting means determining traverse length, and means for preventing rotation of said first and second arresting means with said control screw, whereby rotation of said control screw varies the separation between said first and second arresting means.

4. A builder as defined in claim 3, further comprising first and second trip means moving in synchronism with said traverse and co-operating, respectively, with said first and second arresting means, each of said trip means being adapted in co-operation with the corresponding one of said arresting means to effect reversal of the direction of said traverse.

5. A builder as defined in claim 4, further comprising electrical means responsive to said trip and arresting means for reversing the direction of said traverse.

6. A builder as defined in claim 5, in which said electrical means comprises first and second limit switches adapted when actuated to energize first and second solenoids, respectively.

7. A builder for use in a machine having two members mounted for a relative traverse with respect to each other, comprising
 traverse means connected to at least one of said members for establishing an oscillatory relative traverse of said members with respect to each other,
 first programming means connected to said traverse means and responsive to said traverse for effecting incremental changes in the lengths of selected ones of successive traverses,
 second programming means adjustable independently of said first programming means and connected to said traverse means for effecting incremental changes in the velocities of selected ones of successive traverses to provide a multiplicity of average traverse velocities,
 a threaded rotatable screw connected to said first and second programming means and responsive to the output of said first programming means for providing said second programming means with an input,
 first and second arresting means mounted on said screw, the separation between said first and second arresting means determining said traverse length, and
 means connected to said first arresting means for preventing rotation of said first arresting means with said screw, whereby rotation of said screw varies the separation between said first and second arresting means.

8. A builder for use in a machine having two members mounted for a relative traverse with respect to each other, comprising
 traverse means connected to at least one of said members for establishing an oscillatory relative traverse of said members with respect to each other,
 first programming means connected to said traverse means and responsive to said traverse for effecting incremental changes in the lengths of selected ones of successive traverses,
 second programming means adjustable independently of said first programming means and connected to said traverse means for effecting incremental changes in the velocities of selected ones of successive traverses to provide a multiplicity of average traverse velocities,
 a threaded rotatable control screw connected to said first and second programming means and responsive to the output of said first programming means for providing said second programming means with an input, arresting means mounted on said screw, the position of said arresting means with respect to said screw determining the upper and lower limits of the traverse, and
 means connected to said arresting means for preventing rotation of said arresting means with said screw, whereby rotation of said screw varies the position of said arresting means with respect to said screw.

9. A builder for use in a machine having two members mounted for a relative traverse with respect to each other, comprising
 a pump for pumping a fluid,
 piston-cylinder means operable by said fluid and connected to at least one of said members for establishing an oscillatory relative traverse of said members with respect to each other,
 valve means mounted in series with said pump and said piston-cylinder means for controlling the rate of flow of said fluid to and from said piston-cylinder means,
 trip means mounted for reciprocation in unison with said traverse,
 arresting means mounted adjacent to said trip means for periodic engagement with said trip means, whereby the direction of said traverse is reversed,
 first programming means connected to at least one of said trip and arresting means and responsive to said traverse for controlling the position of said one of said trip and arresting means, and
 second programming means adjustable independently of said first programming means, connected to said valve means and responsive to said traverse for controlling said valve means to provide a multiplicity of average traverse velocities.

10. A builder for use in a machine having two members mounted for a relative traverse with respect to each other, comprising
 traverse means connected to at least one of said members for establishing an oscillatory relative traverse of said members with respect to each other,
 first programming means connected to said traverse means for effecting incremental changes in the lengths of selected ones of successive traverses,
 second programming means adjustable independently of said first programming means, connected to said traverse means and responsive to said traverse for effecting incremental changes in the velocities of selected ones of successive traverses to provide a multiplicity of average traverse velocities,
 a rotatable shaft connected to said first programming means and responsive to said traverse for supplying an input to said first programming means during each traverse cycle,
 a ratchet wheel rigidly mounted on said shaft coaxially therewith,
 an arm pivotally mounted coaxially with said shaft and said wheel,
 means connected to said arm for normally holding said arm in a given position with respect to said wheel, a pawl on said arm engageable with said wheel for rotating said wheel in one direction only, a finger mounted on said arm pivotable with respect thereto between a first position and a second position, means connected to said finger for normally holding said finger in said first position, a reciprocable control rod, means connected to said rod for effecting alternate movement of said rod in a first direction and a second direction in synchronism with said traverse, and means on said rod engageable with said finger during a portion of said movements in said first and second directions, whereby said ratchet wheel is rotated during the movement of said control rod in said first direction and said finger is pivoted with respect to said arm during the movement of said control rod in said second direction.

11. A builder for use in a machine having two members mounted for a relative traverse with respect to each other, comprising hydraulically-powered traverse means connected to at least one of said members for establishing an oscillatory relative traverse of said members with respect to each other, valve means connected to said hydraulically-powered traverse means and reversible for effecting reversal of the direction of said traverse, programming means responsive to selected ones of successive traverses for generating an output, arresting means movable in response to the output of said programming means, whereby successive outputs of said programming means vary the displacement of said arresting means with respect to a reference position, trip means mounted for reciprocation in unison with said traverse and adapted to make contact with said arresting means during each traverse at a point dependent upon said displacement, and electrical means responsive to said contact of said trip means with said arresting means to effect reversal of said valve means, whereby incremental changes in the lengths of selected ones of successive traverses are effected.

12. A builder for use in a machine having two members mounted for a relative traverse with respect to each other, comprising hydraulically-powered traverse means connected to at least one of said members for establishing an oscillatory relative traverse of said members with respect to each other, first valve means connected to said hydraulically-powered traverse means and reversible for effecting reversal of the direction of said traverse, second valve means connected to said hydraulically-powered traverse means for controlling the velocity of said traverse, first programming means responsive to selected ones of successive traverses for generating an output, a control screw rotatable in response to the output of said first programming means and having first and second oppositely-threaded portions, first arresting means mounted on said first portion, second arresting means mounted on said second portion, means for preventing rotation of said first and second arresting means with said control screw, whereby rotation of said control screw varies the displacement of said first and second arresting means with respect to each other, trip means mounted for reciprocation in unison with said traverse and adapted to make contact with one of said first and second arresting means during each traverse at a point dependent upon said displacement, electrical means responsive to said contact of said trip means with one of said first and second arresting means to effect reversal of said first valve means, whereby incremental changes in the lengths of selected ones of successive traverses are effected, and second programming means responsive to rotation of said control screw, adjustable independently of said first programming means and connected to said second valve means for effecting incremental changes in the velocities of selected ones of successive traverses to provide a multiplicity of average traverse velocities.

13. A builder for use in a machine having two members mounted for a relative traverse with respect to each other, comprising hydraulically-powered traverse means connected to at least one of said members for establishing an oscillatory relative traverse of said members with respect to each other, flow-control valve means connected to said hydraulically-powered traverse means and adjustable for controlling the velocity of said traverse, and programming means responsive to selected ones of successive traverses for adjusting said flow-control valve means to effect incremental changes in the average traverse velocities of selected ones of successive traverses.

References Cited in the file of this patent

UNITED STATES PATENTS

| | | |
|---|---|---|
| 1,812,382 | Swanson | June 30, 1931 |
| 1,946,699 | Keyser | Feb. 13, 1934 |
| 2,019,364 | Schweizer | Oct. 29, 1935 |
| 2,575,031 | Smith | Nov. 13, 1951 |
| 2,699,297 | Weinreich et al. | Jan. 11, 1955 |

FOREIGN PATENTS

| | | |
|---|---|---|
| 139,061 | Australia | Oct. 17, 1950 |